United States Patent
Kim et al.

(10) Patent No.: US 8,553,083 B2
(45) Date of Patent: Oct. 8, 2013

(54) APPARATUS AND METHOD FOR AUTOMATICALLY ADJUSTING CAMERA

(75) Inventors: Hyun-Soo Kim, Yongin-si (KR); Sang-Ho Kim, Suwon-si (KR); Seong-Taek Hwang, Pyeonglaek-si (KR); Sang-Wook Oh, Ansan-si (KR); Sung-Cheol Kim, Goyang-si (KR)

(73) Assignee: Samsung Electronics Co., Ltd (KR)

(*) Notice: Subject to any disclaimer, the term of this patent is extended or adjusted under 35 U.S.C. 154(b) by 504 days.

(21) Appl. No.: 12/632,101

(22) Filed: Dec. 7, 2009

(65) Prior Publication Data
US 2010/0141758 A1    Jun. 10, 2010

(30) Foreign Application Priority Data
Dec. 5, 2008  (KR) .................. 10-2008-0123019

(51) Int. Cl.
*H04N 7/18* (2006.01)
*G09G 5/00* (2006.01)

(52) U.S. Cl.
USPC ............ 348/135; 348/745; 382/171; 382/321

(58) Field of Classification Search
USPC ................. 348/349, 240.3, 240.99, 135, 745; 715/863; 463/33; 382/103, 171, 321; 705/14
See application file for complete search history.

(56) References Cited

U.S. PATENT DOCUMENTS

| | | | | |
|---|---|---|---|---|
| 7,824,265 | B2* | 11/2010 | Kobayashi | 463/33 |
| 8,209,635 | B2* | 6/2012 | Thom | 715/863 |
| 2005/0012833 | A1* | 1/2005 | Yokota et al. | 348/240.99 |
| 2006/0126894 | A1* | 6/2006 | Mori | 382/103 |
| 2006/0146148 | A1* | 7/2006 | Burke | 348/240.99 |
| 2006/0146174 | A1* | 7/2006 | Hagino | 348/349 |
| 2006/0170793 | A1* | 8/2006 | Pasquarette et al. | 348/240.99 |
| 2007/0257996 | A1* | 11/2007 | Kurosawa et al. | 348/240.99 |
| 2008/0018754 | A1* | 1/2008 | Ejima et al. | 348/240.3 |
| 2008/0189173 | A1* | 8/2008 | Bakar et al. | 705/14 |

FOREIGN PATENT DOCUMENTS

| | | |
|---|---|---|
| JP | 2006-094082 | 4/2006 |
| KR | 1020050106588 | 11/2005 |

* cited by examiner

*Primary Examiner* — Jungwon Chang
(74) *Attorney, Agent, or Firm* — The Farrell Law Firm, P.C.

(57) ABSTRACT

A method is provided for automatically adjusting a size of characters using a camera. The method includes receiving an image with characters; adjusting a focus of the image with characters and detecting a region and a size of characters in the image; determining whether the size of the characters in the image falls within a preset range; recognizing the characters in the image and displaying the recognition results, if the size of characters falls within the preset range; and automatically adjusting a zoom ratio of the image and recognizing the characters in the resized image, if the size of the characters does not fall within the preset range.

7 Claims, 5 Drawing Sheets

APPARATUS AND METHOD FOR AUTOMATICALLY ADJUSTING CAMERA

PRIORITY

This application priority under 35 U.S.C. §119(a) to a Korean Patent Application filed in the Korean Intellectual Property Office on Dec. 5, 2008 and assigned Ser. No. 10-2008-0123019, the entire disclosure of which is incorporated herein by reference.

BACKGROUND OF THE INVENTION

1. Field of the Invention

The present invention relates generally to character recognition using a camera, and more particularly, to an apparatus and method for optimizing user views by adjusting a size of characters in an image received by means of a camera.

2. Description of the Related Art

Camera-based Optical Character Recognition (OCR) may be classified into Snapshot OCR (OCR based on a view of an image to be photographed) and Preview OCR (OCR based on a preview image or viewfinder images). In SnapShot OCR, an image is acquired according to the same method as a normal method for acquiring an image for a photograph. The image acquisition process includes, in turn, photographing desired characters by means of a camera, performing a character recognition process on the photographed characters, and outputting the recognition results to an output unit.

By contrast, in Preview OCR, images are input at a preset rate of Frames. Per Second (FPS). Therefore, in Preview OCR, character recognition is possible in real time. Generally, an image acquisition process of Preview OCR includes scanning characters by a user by means of a camera, and continuously performing a recognition operation on an image received through the camera using a recognizes in the camera.

The largest difference between Snapshot OCR and Preview OCR consists in the resolution of an image to be recognized. While Preview OCR recognizes a small image of Quater Video Graphics Array (QVGA; 320×240) for real-time recognition, Snapshot OCR recognizes an image of 1 Mega pixels or more, thus having a longer recognition time compared with Preview OCR. Due to the use of high-resolution images, Snapshot OCR is far superior to Preview OCR in character recognition capability. Recently, as the performance of cameras improves and accurate recognition becomes increasingly important. Snapshot OCR has become widely used than Preview OCR.

It is possible for Snapshot OCR to recognize all characters in an input image, or characters corresponding to a particular region among all the characters in the input image. Hence, a user may perform full recognition on the image displayed on a Liquid Crystal Display (LCD) screen of the camera, or perform partial recognition on a particular region designated.

Figure 1:
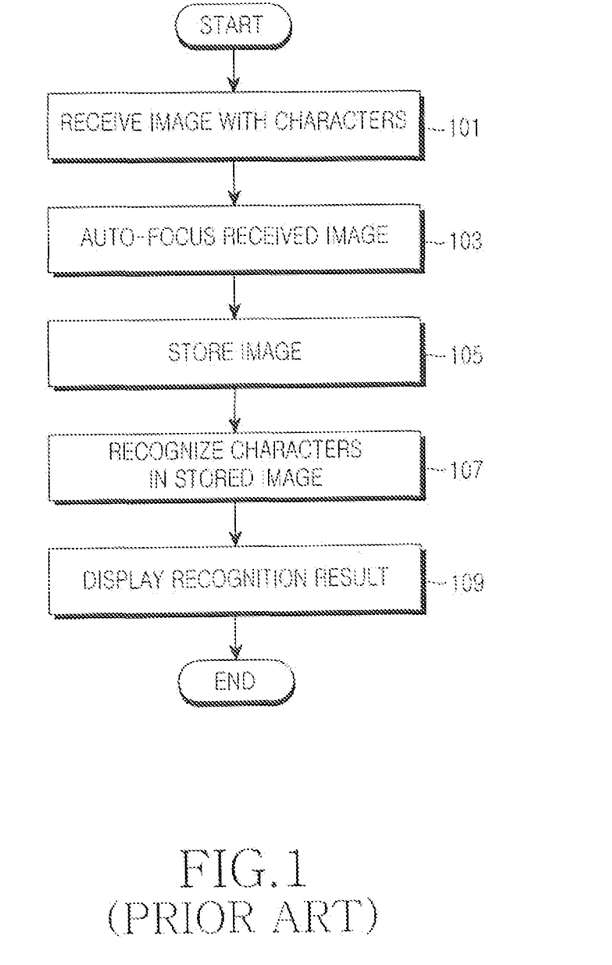
FIG. 1 is a flowchart illustrating a conventional process of recognizing characters in an image.

FIG. 1 illustrates a conventional process of recognizing characters in an image.

In step 101, a mobile terminal receives an image with characters using a camera module. In step 103, the mobile terminal may acquire a focused image from the received image using an Automatic Focusing (Auto-Focus) technique. In step 105, the mobile terminal stores the acquired focused image in a separate storage. In step 107, the mobile terminal recognizes characters in the stored image. The mobile terminal may recognize all the characters in the image or only characters in a region of the image selected by the user. In step 109, the mobile terminal displays the recognition results on its display.

Since, unlike the conventional name-card recognition, Snapshot OCR has no limitation on a recognizable distance desired by the user, characters in the input image may vary in size. For example, when an image, in which very large characters and very small characters are included in various ways, is resized on an LCD, the sizes of the displayed characters are also appear very small and very large, proportionally to the actual image. The excessively large or small size of the characters displayed on the LCD may reduce recognition efficiency or cause recognition failure.

SUMMARY OF THE INVENTION

An aspect of the present invention is to address at least the above-mentioned problems and/or disadvantages and to provide at least the advantages, described below. Accordingly, an aspect of the present invention provides an apparatus and method for optimizing a size of characters in an image by automatically adjusting a zoom ratio using a zoom function of a camera when the size of the characters in the image does not fall within a predetermined range.

According to one aspect of the present invention, there is provided a method for automatically adjusting a size of characters using a camera. The method includes receiving an image containing characters; adjusting a focus of the image and detecting a region and a size of characters in the image; determining whether the size of the characters in the image falls within a preset range; recognizing the characters in the image and displaying recognition results, if the size of the characters falls within the preset range; and automatically adjusting a zoom ratio of the image and recognizing the characters in the resized image, if the size of the characters does not fall within the preset range.

According to another aspect of the present invention, there is provided an apparatus for automatically adjusting a size of characters using a camera. The apparatus includes a camera module for receiving an image containing characters, transmitting the received image, and automatically adjusting a zoom ratio if a size of the characters does not fall within a preset range; a recognizer module for transmitting character recognition results received after transmitting the image received from the camera module; a Optical character Recognition (OCR) recognition engine module for determining whether a size of characters in the image received from the recognizer module falls within the preset range; and a dictionary module for providing a dictionary definition of the recognized characters received from the recognizer module.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Since conventional mobile terminals for recognizing characters in an image have no limitations on recognizable distances desired by users, excessively large or small size of characters in an input image may not be properly recognized in a character recognition process. To address these and other problems and/or disadvantages, the present invention provides an apparatus and method for receiving an image with characters having a proper size, by means of a zoom function, for precise recognition of the characters. Features of the present invention will be more apparent by describing certain embodiments of the present invention.

Figure 2:
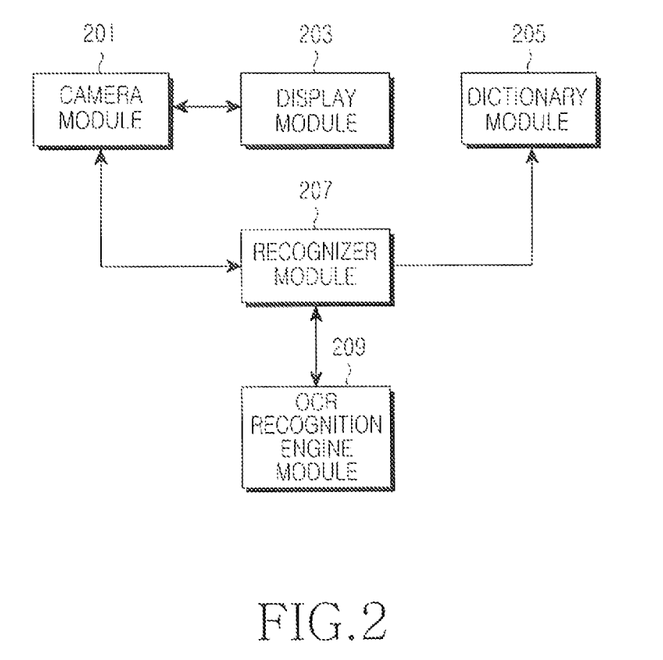
FIG. 2 is a diagram illustrating an internal structure of a mobile terminal for recognizing characters according to an embodiment of the present invention.

FIG. 2 illustrates an internal structure of a mobile terminal for recognizing characters according to an embodiment of the present invention. The mobile terminal includes a recognizer module 207, an OCR recognition engine module 209, a camera module 201, a display module 203, and a dictionary module 205.

Referring to FIG. 2, the recognizer module 207, a module for controlling the overall operation of an application called Snapshot OCR, mainly initiates and terminates an application for recognizing characters in an image, like character recognition of a camera. In accordance with an embodiment of the present invention, the recognizer module 207 implements pre-recognition, including resizing an image received from the camera module 201 for recognition of characters in the image.

The OCR recognition engine module 209 receives the image with characters from the recognizer module 207, performs character recognition on the received image, and transmits the recognition results back to the recognizer module 207. As to the criteria for recognizing characters, the OCR recognition engine module 209 determines whether a size of the characters falls within a preset range of a recognizable character size, and transmits the determined results back to the recognizer module 207.

The camera module 201 receives an image with characters by driving and controlling a camera. In the process of receiving an image, the camera module 201 captures a clear image using an Auto-Focus function, and if the size of the characters in the image is excessively large or small, captures an image with characters having a size desired by the user using a zoom function. Auto-Focus, an important function for increasing an image recognition rate, serves to increase a resolution of an input image.

The display module 203 outputs at least one of a camera preview image, a photographed image, and character recognition results on a screen.

The dictionary module 205 provides a dictionary definition of the characters recognized by the OCR recognition engine module 209 based on a dictionary search interface function. A variety of information in the dictionary module 205 is stored in a DataBase (DB) in the mobile terminal. However, if required information is not stored in the DB in the mobile terminal, the dictionary module 205 may receive the required information from a DB in a server. A process of recognizing characters in an image using the aforesaid structure will be described as follows.

Figure 3:
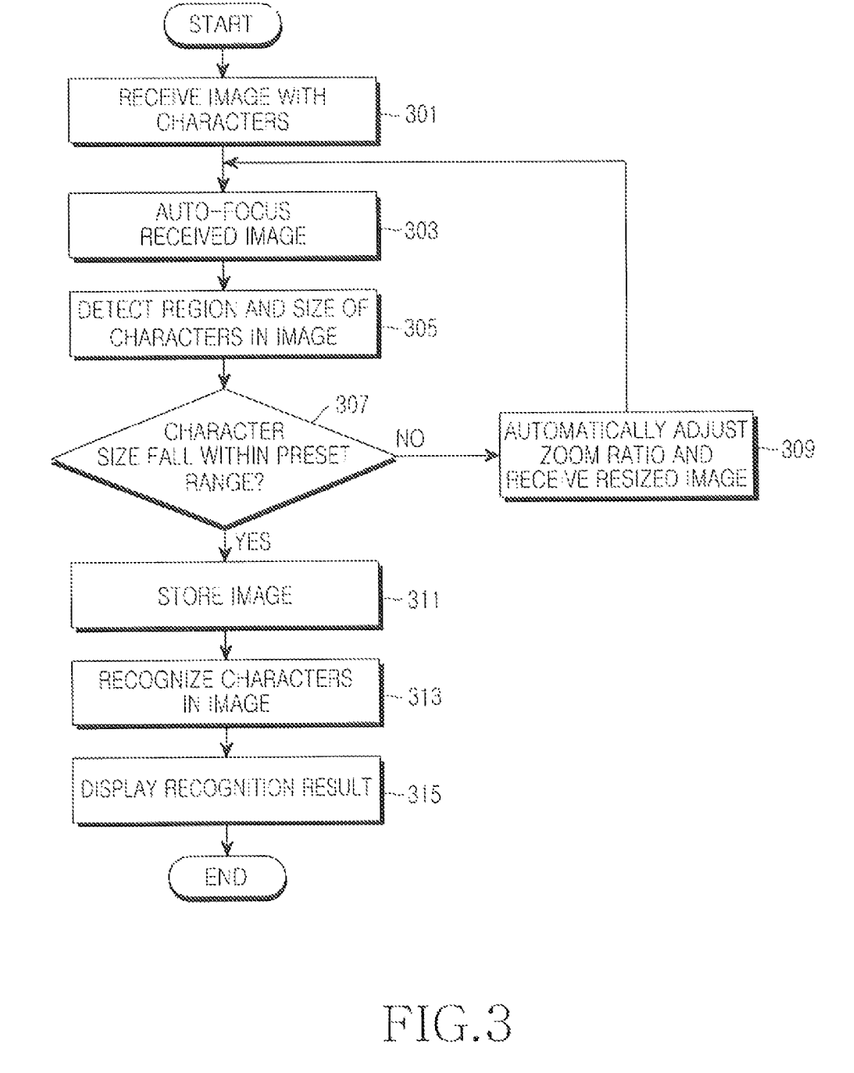
FIG. 3 is a flowchart illustrating a process of recognizing characters in an image according to an embodiment of the present invention.

FIG. 3 illustrates a process of recognizing characters in an image according to an embodiment of the present invention.

Referring to FIG. 3, the mobile terminal receives an image with characters using a camera module, in step 301. The received image may be displayed for viewing by a user. In step 303, the mobile terminal acquires a focused image by adjusting the focus of the received image using an automatic focusing technique. In step 305, the mobile terminal detects a character region within the acquired image by means of a character size measurer, and then detects a size of the characters within the character region by detecting a line on which characters exist, in the X- and Y-axes with use of a threshold, and calculates an average size of characters on the line.

In step 307, the mobile terminal compares the measured character size with a preset range of a recognizable character size, and determines whether the measured character size falls within the range of the recognizable character size. If the measured character size does not fall within the range, the mobile terminal automatically adjusts a zoom ratio, or a zoom magnification, so that the measured character size falls within the range, and then receives the resized image in step 309. After performing step 309, the method returns to step 303, where the mobile terminal adjusts the focus of the zoomed image, and then re-performs the character region and size detection in step 305.

If the measured character size falls within the range of the recognizable character size in step 307, the mobile terminal stores the image for accurate character recognition in step 311. The mobile terminal recognizes characters in the stored image in step 313, and displays the recognition results corresponding to the information desired by the user, on a display in step 315.

In FIG. 3, when the measured character size does not fall within the range of the recognizable character size, the character size may be excessively large or excessively small. When the character size is excessively large, the mobile terminal may simply decrease the zoom ratio and receive the resized image. However, if the character size is excessively small and the zoom ratio has already been increased to the maximum zoom ratio, the increased character size may still not fall within the recognizable character size range. In this case, characters in the image may be recognized as follows.

Figure 4:
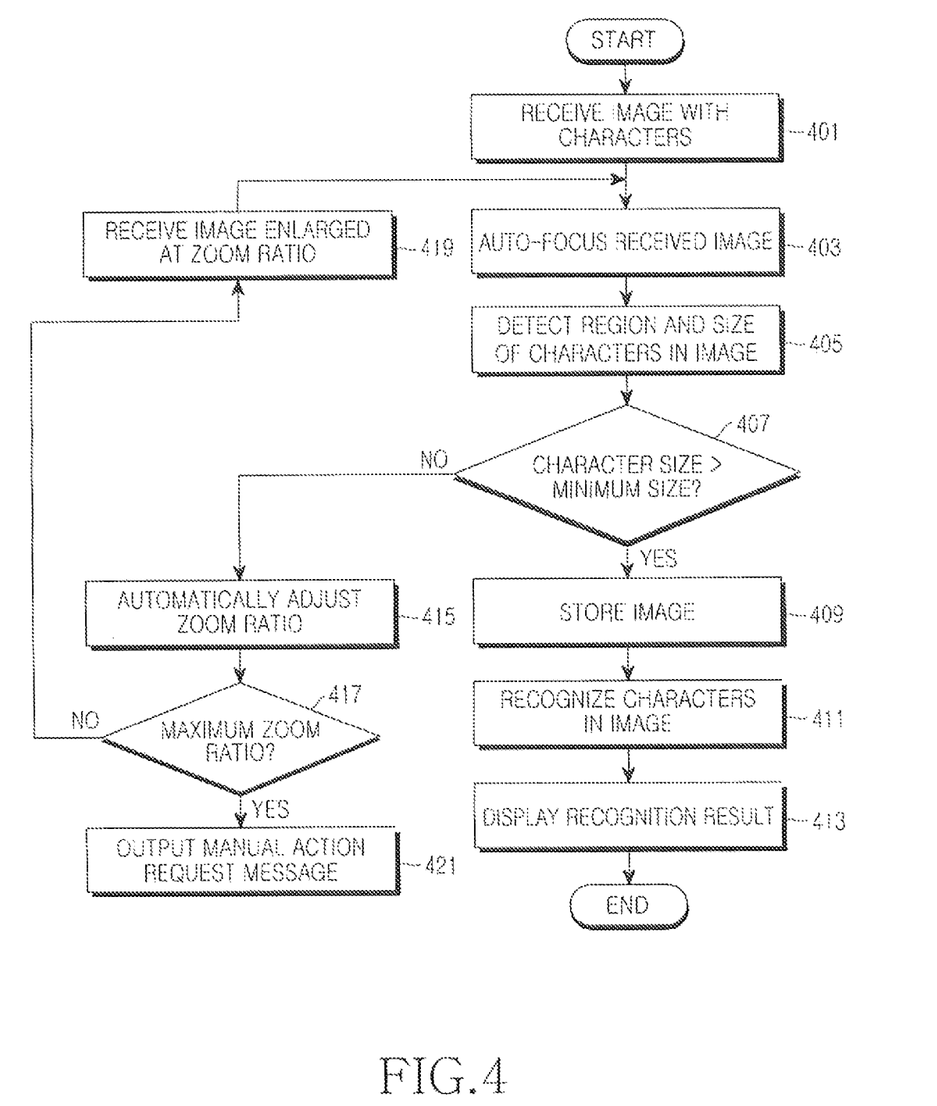
FIGS. 4 and 5 are flowcharts illustrating a process of enlarging a size of characters in an image using a zoom function according to an embodiment of the present invention.
Figure 5:
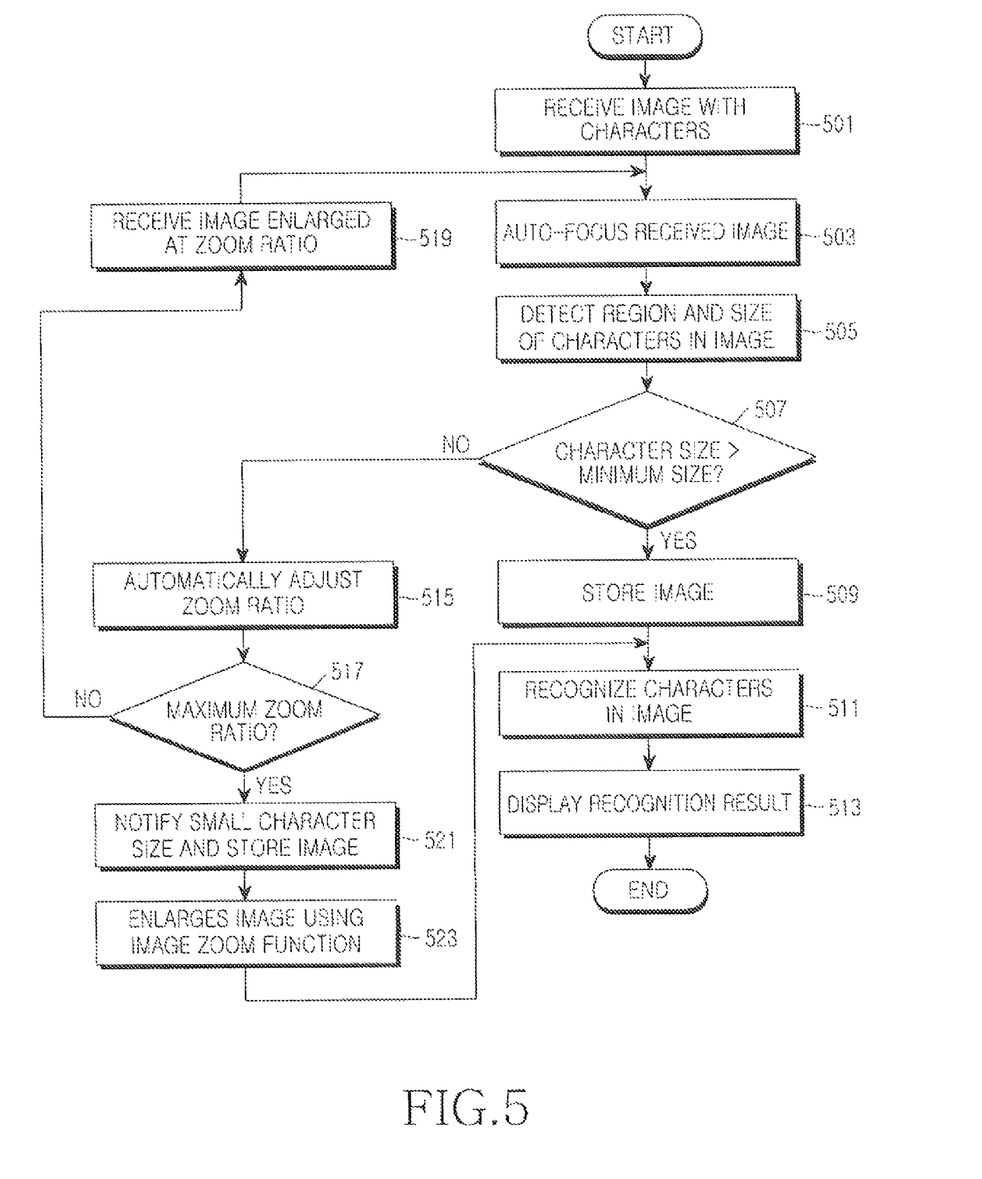

FIGS. 4 and 5 illustrate processes of enlarging a size of characters in an image using a zoom function according to an embodiment of the present invention. As an example, FIG. 4 illustrates a method for a, mobile terminal that supports only an optical zoom function, while FIG. 5 illustrates a method for a mobile terminal supporting both an optical zoom function and digital image zoom function. In both FIGS. 4 and 5, the mobile terminal first uses an optical zoom function, which does not influence the image quality. In FIG. 5, the mobile terminal uses a digital image zoom function, when the mobile terminal cannot recognize characters only with the optical zoom function.

Referring to FIG. 4, the mobile terminal receives an image with characters using a camera module in step, 401. The received image may be displayed for viewing by a user. In step 403, the mobile terminal acquires a focused image by adjusting the focus of the received image using the automatic focusing technique. In step 405 the mobile terminal detects a character region from the acquired image by means of a character size measurer, and then detects a size of the characters within the character region.

In step 407, the mobile, terminal determines whether the detected character size is greater than a predetermined minimum size of a distinguishable character. If the measured character size is greater than the minimum size, the mobile terminal stores the image for precise character recognition in step 409, recognizes characters in the stored image in step 411, and displays the recognition results corresponding to the information desired by the user, on a display in step 413.

However, if the measured character size is less than the size of the minimum distinguishable character in step 407, the mobile terminal automatically adjusts a zoom ratio in step 415. In step 417, the mobile terminal determines whether the adjusted zoom ratio is the maximum zoom ratio. If the adjusted zoom ratio is not the maximum zoom ratio, the mobile terminal re-receives the image enlarged at the adjusted zoom ratio in step 419. However, if the adjusted zoom ratio is the maximum zoom ratio, the mobile terminal cannot recognize the detected characters as the mobile terminal cannot further increase the zoom ratio. Therefore, the mobile terminal displays a manual action request message on an output unit or a display for the user in step 421, informing that it is not possible to distinguish the detected characters at the current location of the user. In this case, the user may acquire a desired size of characters by moving the mobile terminal closer to the subject having the characters.

Referring to FIG. 5, the mobile terminal receives an image with characters using camera module in step 501. The received image may be displayed for viewing by a user. In step 503, the mobile terminal acquires a focused image by adjusting the focus of the received image using the automatic focusing technique. In step 505, the mobile terminal detects a character region from the acquired image by means of a character size measurer, and theft detects a size of the characters.

In step 507, the mobile terminal determines whether the detected character size is greater than a predetermined minimum size of a distinguishable character. If the measured character size is greater than the minimum size, the mobile terminal stores the image for precise character recognition in step 509. The mobile terminal recognizes characters in the stored image in step 511, and displays the recognition results corresponding to the information desired by the user, on its display in step 513.

If the measured character size is less than the size of the minimum distinguishable character in step 507, the mobile terminal automatically adjusts a zoom ratio in step 515. In step 517, the mobile terminal determines whether the adjusted zoom ratio is the maximum zoom ratio. If the adjusted zoom ratio is not the maximum zoom ratio, the mobile terminal re-receives the image enlarged at the adjusted zoom ratio in step 519. However, if the adjusted zoom ratio is the maximum zoom ratio, the mobile terminal provides the user with a message indicating that the character size is small for recognition, and stores the image in step 521. This message is displayed on an output unit or display of the mobile terminal. In step 523, the mobile terminal enlarges a region corresponding to characters in the stored image using a digital image zoom function. Thereafter, the mobile terminal recognizes characters in the enlarged image using the image zoom in step 509, and displays the recognition results in Step 513.

As is apparent from the foregoing description, embodiments of the present invention can optimize the size of characters in an image so that the user may easily carry out an operation of distinguishing and recognizing characters in the image on the LCD, thereby increasing the character recognition rate.

While an apparatus and method for adjusting a size of characters using a camera according to the present invention has been shown and described with reference to a certain embodiments of the present invention, it will be understood by those skilled in the art that various changes in form and details may be made therein without departing from the spirit and scope of the invention as defined by the appended claims and their equivalents.

What is claimed is:

1. A method for automatically adjusting a size of characters using a camera, comprising:
    receiving an image containing characters;
    detecting a region and a size of characters in the image;
    determining whether the size of the characters in the image falls within a recognizable character size range;
    if the size of the characters falls within the recognizable character size range, recognizing the characters in the image and displaying recognition results; and
    if the size of the characters does not fall within the recognizable character size range, automatically adjusting a zoom ratio of the image so that the size of the characters in the image falls within the recognizable character size range, and recognizing the characters in the resized image.

2. The method of claim 1, wherein receiving the image comprises adjusting a focus of the image using an automatic focusing technique.

3. The method of claim 2, wherein adjusting the focus comprises detecting a line on which the characters in the image exist, in X- and Y-axes, and
    wherein detecting the region and the size of the characters comprises detecting the region and size of the characters by calculating a height and a length of the characters on the line.

4. The method of claim 1, wherein if the size of the characters does not fall within the recognizable character size range, recognizing the characters comprises:
    if the size of the characters is greater than the recognizable character size range, automatically decreasing the zoom ratio and re-acquiring the resized image; and
    if the size of the characters is less than a lower limit of the recognizable character size range automatically increasing the zoom ratio and re-acquiring the resized image.

5. The method of claim 1, further comprising, if the size of the characters is less than a lower limit of the recognizable character size range and if a zoom ratio needed to compensate the image is higher than a maximum zoom ratio, providing a manual action request message to a user.

6. The method of claim 1, further comprising:
    if the size of the characters is less than a lower limit of the recognizable character size range and if a zoom ratio needed to compensate the image is higher than a maximum zoom ratio, generating a user notification for informing a user that the size of the characters is too small for recognition and displaying the image;
    enlarging a region corresponding to the characters in the stored image using a digital image zoom function; and
    recognizing the characters in the enlarged region and displaying recognition results.

7. A method for automatically adjusting a size of characters using a camera, comprising:
    receiving an image containing characters;
    adjusting a focus of the image and detecting a region and a size of characters in the image;
    determining whether the size of the characters in the image falls within a recognizable character size range;

if the size of the characters is greater than the recognizable character size range, recognizing the characters in the image and displaying recognition results;

if the size of the characters is less than the recognizable character size range, automatically adjusting a zoom ratio of the image and recognizing the characters in the resized image;

if the size of the characters is less than a lower limit of the recognizable character size range and if a zoom ratio needed to compensate the image is higher than a maximum zoom ratio, generating a user notification for informing a user that the size of the characters is too small for recognition and displaying the image;

enlarging a region corresponding to the characters in the stored image using a digital image zoom function; and recognizing the characters in the enlarged region and displaying recognition results, wherein generating the notification comprises outputting a message indicating that the size of the characters is too small for recognition.

* * * * *

UNITED STATES PATENT AND TRADEMARK OFFICE
CERTIFICATE OF CORRECTION

PATENT NO. : 8,553,083 B2  
APPLICATION NO. : 12/632101  
DATED : October 8, 2013  
INVENTOR(S) : Hyun-Soo Kim et al.

Page 1 of 1

It is certified that error appears in the above-identified patent and that said Letters Patent is hereby corrected as shown below:

Title Page, item (54) and in the specification, Column 1, line 1-3, Title:

"APPARATUS AND METHOD FOR AUTOMATICALLY ADJUSTING CAMERA" should be

-- APPARATUS AND METHOD FOR AUTOMATICALLY ADJUSTING SIZE OF CHARACTERS USING CAMERA --

Signed and Sealed this  
Fourth Day of February, 2014

Michelle K. Lee  
*Deputy Director of the United States Patent and Trademark Office*